Nov. 16, 1948.  W. SCHAELCHLIN ET AL  2,454,216
APPARATUS AND SYSTEM FOR ELECTRIC CONTROL PURPOSES
Filed March 27, 1947  3 Sheets-Sheet 1
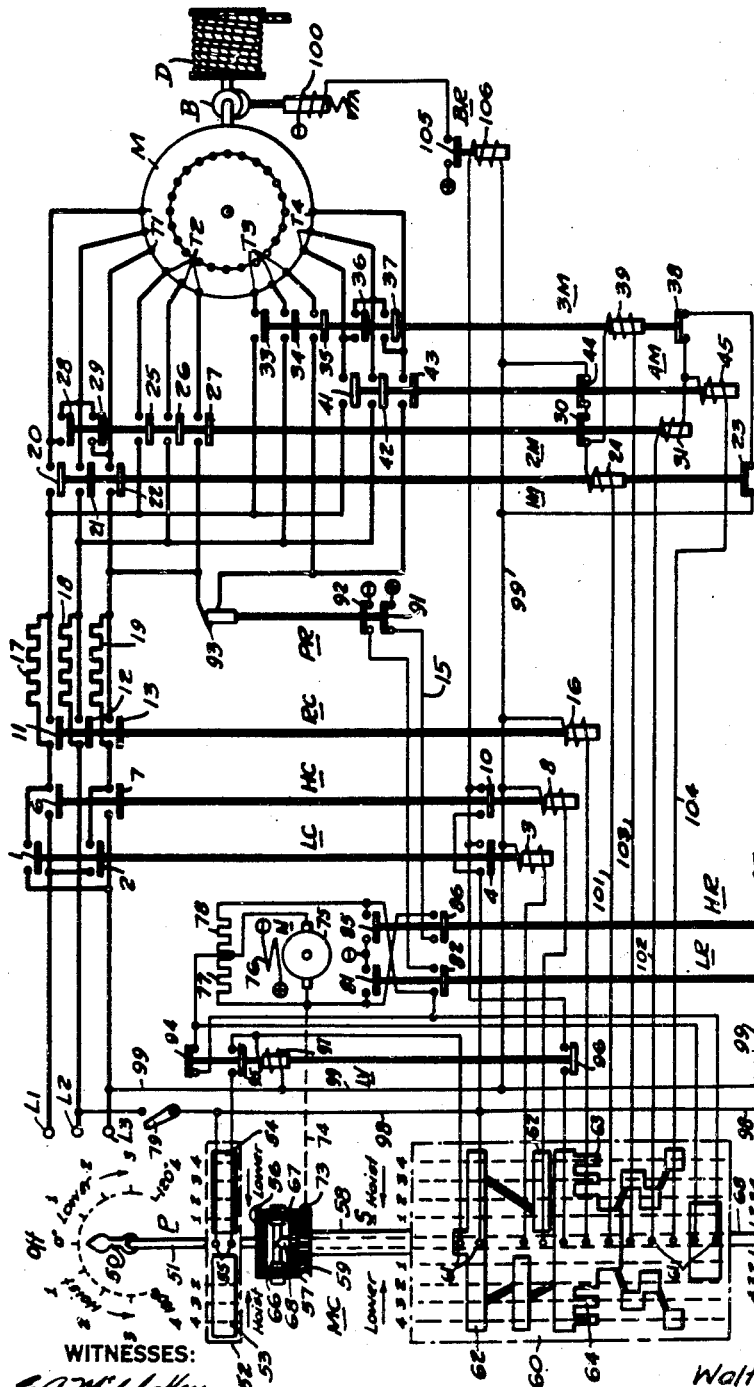
WITNESSES:
INVENTORS
Walter Schaelchlin
and Kurt Mahnke.
BY
ATTORNEY Nov. 16, 1948. W. SCHAELCHLIN ET AL 2,454,216
APPARATUS AND SYSTEM FOR ELECTRIC CONTROL PURPOSES
Filed March 27, 1947 3 Sheets-Sheet 2
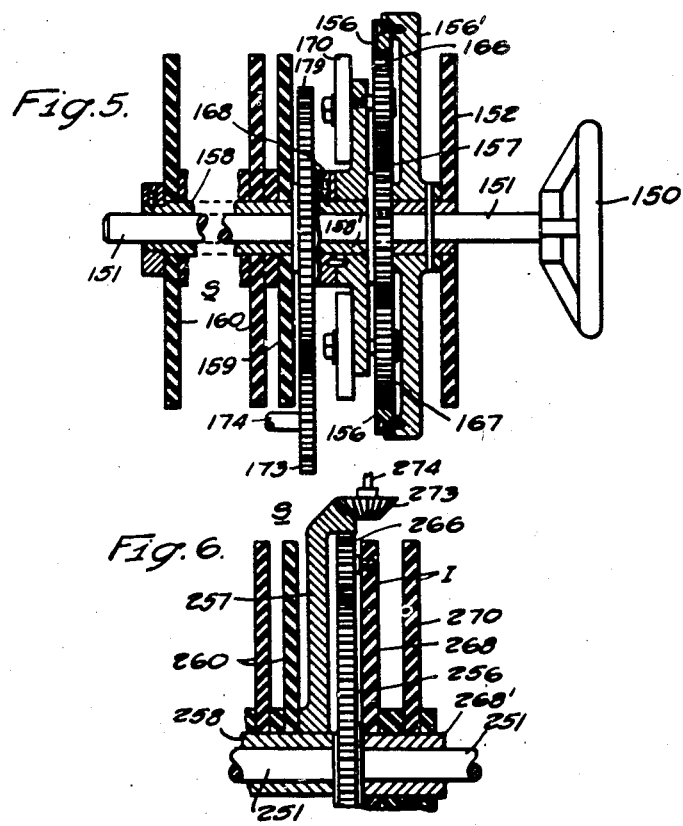
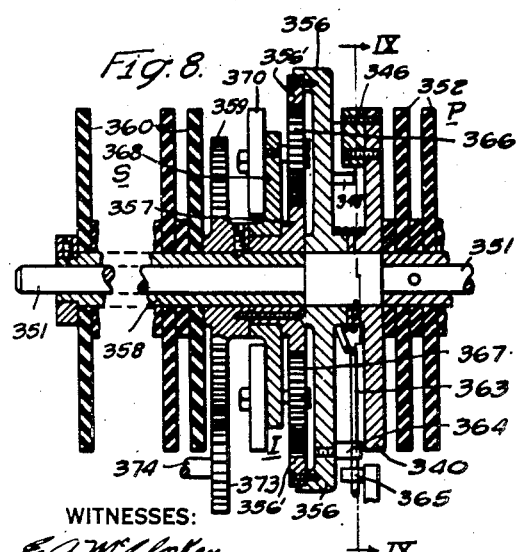
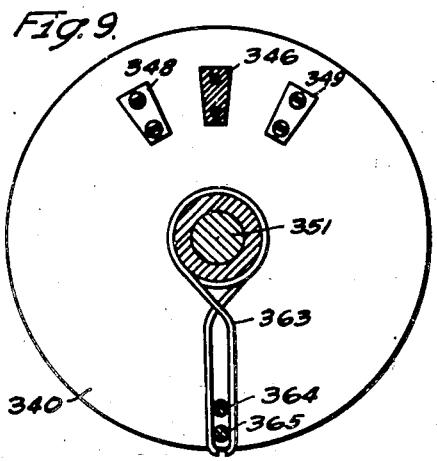
INVENTORS
Walter Schaelchlin
and Kurt Mahnke.
BY
ATTORNEY Nov. 16, 1948.   W. SCHAELCHLIN ET AL   2,454,216
APPARATUS AND SYSTEM FOR ELECTRIC CONTROL PURPOSES
Filed March 27, 1947   3 Sheets-Sheet 3
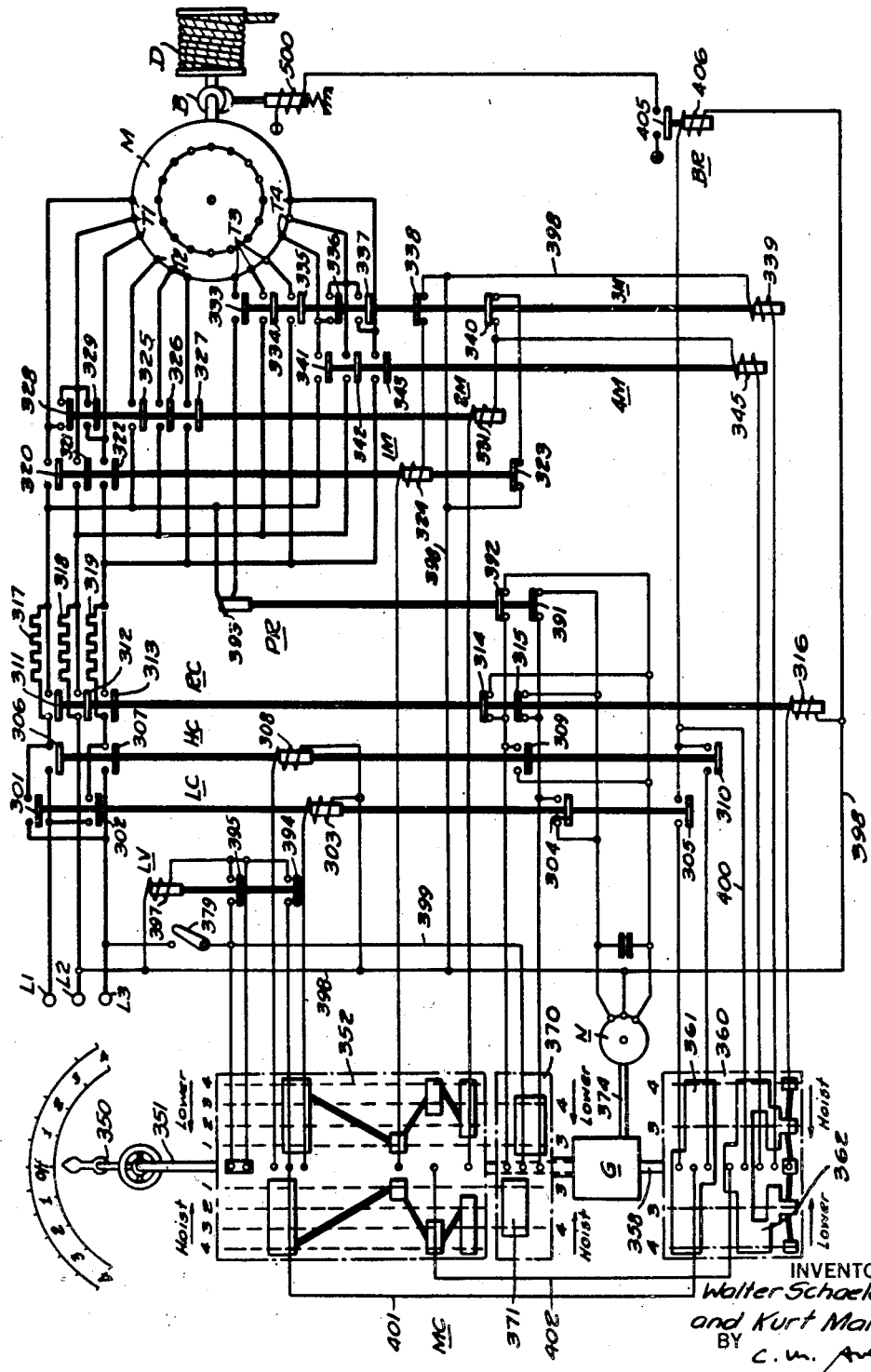
Fig. 7.
INVENTORS
*Walter Schaelchlin
and Kurt Mahnke.*
BY 
ATTORNEY Patented Nov. 16, 1948

2,454,216

UNITED STATES PATENT OFFICE 2,454,216

APPARATUS AND SYSTEM FOR ELECTRIC CONTROL PURPOSES

Walter Schaelchlin and Kurt Mahnke, Pittsburgh, Pa., assignors to Westinghouse Electric Corporation, East Pittsburgh, Pa., a corporation of Pennsylvania Application March 27, 1947, Serial No. 737,612

10 Claims. (Cl. 318—224)

Our invention in its broad aspects relates to apparatus for controlling an electric system to assume selective and progressively variable conditions of operation which require a timing of the permissible maximum speeds of transfer from one to another control condition. In one of its more specific aspects, our invention concerns itself with apparatus and systems for controlling the speed of electric motors, under observance of a timed control performance during acceleration or deceleration of the motor. In another aspect, the invention relates to controls for multispeed alternating-current motors which have a plurality of terminal groups for operating with respectively different numbers of field poles in order to run the motor at one of a plurality of available speeds depending upon which terminal group is energized at a time.

Control systems of the above-mentioned type are usually controlled by an operator or attendant and are called upon to perform certain functions virtually instantaneously, i. e., as soon as the proper signal is given by the operator-actuated master control means, while certain other functions must be performed with a given delay regardless of the speed at which the setting of the master control means is changed by the operator.

In the conventional control systems, especially for operating electric motors at adjustable speed, these control functions are performed with the aid of relays, those for controlling the instantaneously responsive functions being undelayed and those for controlling the timed functions being designed as, or equipped with, timing devices.

In comparison with the just-mentioned state of the art, it is one of the objects of our invention to provide control systems and apparatus in which the instantaneous as well as the timed functions are performed by means of a single master control apparatus so that a number of relays and timing devices usually required for such purposes are dispensed with.

Another object of the invention, relating especially to the control of multispeed alternating-current motors, is to provide a control system which secures a smooth transfer from one to another motor speed regardless of the velocity at which the master control means are actuated.

It is also an object of our invention to devise control systems for multispeed alternating-current motors that are especially suitable for operating hoists, winches, and the like equipment that require the motor to run at different selective speeds in the hoisting or heave-in direction as well as in the lowering or payout direction.

These and other objects of our invention will become apparent from the following description.

According to one feature of the invention, we provide an electric control apparatus, to perform the functions of a master controller as well as those of a timing device, which is equipped with three movable members or contact control units. The first member (primary member) is angularly adjustable between a plurality of positions under control by the operator and in accordance with the desired motor speed. The second (secondary) member is driven by an auxiliary or pilot motor so as to perform a follow-up movement. This secondary member has also a plurality of angular positions, some or all of which correspond to those of the primary member; and upon a proper change in the setting of the primary member, the secondary member is driven by the auxiliary motor to assume the corresponding position within an interval of time determined solely by the operation of the auxiliary motor rather than by the speed of adjustment of the primary member. The third (intermediate) member performs one cycle of an oscillatory or deflecting movement which begins at the moment when the setting of the primary member is changed and ends at the moment when the secondary member reaches the corresponding follow-up position. The three members are geared together by a differential mechanism so that the intermediate member is actuated by the intermediate or planet gears while the primary and secondary member are associated with the two other gears of the mechanism. In conjunction with the just-mentioned features, it is essential that all three members of the control apparatus are equipped with respective control contacts. Those of the primary member cooperate in performing the above-mentioned instantaneously responsive functions of the control system of which the master control means form part. The contacts of the secondary member serve to perform the timing functions in the just-mentioned system. The contacts of the intermediate member control the auxiliary motor that drives the secondary member.

According to another feature of the invention, a control apparatus, as set forth above, is used in connection with the control circuits of a multispeed alternating-current motor in order to permit a selective and progressive speed adjustment under control by the operator. According to this feature, the contacts of the secondary member are connected with some or all of the circuits that operate to select one of the motor terminal groups for connection with the line terminals.

According to another feature of the invention, a multispeed alternating-current motor has one or several of its terminal groups, for operating the motor at high speeds, connected with the contacts of the above-mentioned secondary member while one or several of the remaining terminal groups of the motor are controlled by the contacts of the primary member. As a result, a change in motor speed adjusted by the operator is effected substantially without delay as long as the motor operates at the lower speeds, while the transfer from one speed to another is time delayed when the motor is operating at the higher speeds.

According to still another feature of our invention, we provide the load circuit of the motor with impedance or resistance means which are normally short circuited or otherwise rendered ineffective and which become operative in the motor circuit only during some or all intervals of speed transfer in order to then cushion the effect of transitory overload currents.

In order to elucidate the above-mentioned features of our invention and for disclosing other features and details, reference is made in the following to the embodiments exemplified in the drawings, in which:

Figure 1 represents diagrammatically a control system according to the invention for a marine winch driven by a multispeed alternating-current motor;

Figs. 2, 3 and 4 are explanatory and represent schematically the master control operators of the system of Fig. 1 in three different conditions of operation, respectively;

Fig. 5 is a cross sectional and partial view of master control operators of modified design and applicable in a system according to Fig. 1 instead of the apparatus represented in that figure;

Fig. 6 shows another modification of a master control apparatus applicable in a system according to Fig. 1, this illustration being also sectional and representing only part of the apparatus;

Fig. 7 represents diagrammatically another embodiment of a motor control system for a winch designed in accordance with the present invention;

Fig. 8 shows a cross sectional view of a master control apparatus applicable in a system according to Fig. 7; while Fig. 9 shows a cross section through the apparatus of Fig. 8, the section being taken along the radial plane denoted by the dot and dash line marked IX—IX in Fig. 8.

According to Fig. 1, the cable drum D of a winch is equipped with a friction brake B which is spring set and electromagnetically releasable. The drum shaft is connected to a motor M, preferably by the customary reduction gears (not shown). The motor M is of the squirrel-cage type and has two sets of field windings. Each set is so wound and tapped that it permits energizing the motor field system with two different numbers of field poles. In the illustrated example, it is assumed that the motor terminals denoted by T1, when energized, serve to produce a field of 32 poles for slow (first) motor speed while the group of terminals denoted by T2, appertaining to the same set of field windings as the terminals T1, serve to operate the motor with 16 field poles at twice the minimum speed (second speed). The motor terminals T3 and T4 appertain to the second set of field windings. Terminals T3 when energized serve to produce a motor field with 8 poles and terminals T4 produce a 4 pole field for running the motor at third and fourth speeds respectively.

The motor terminals are energized from line terminals L1, L2 and L3 under control by alternatively energized directional contactors LC and HC, an auxiliary contactor RC, and four selectively operating speed control contactors 1M, 2M, 3M and 4M.

The contactor LC, when closing its main contacts 1 and 2, energizes the motor for operating in the lowering or pay-out direction. Contacts 1 and 2 are controlled by a coil 3 which actuates also an interlock contact 4.

The hoist contactor HC, when closing its main contacts 6 and 7, energizes the motor for operating in the hoist or heave-in direction, and has a coil 8 which actuates also an interlock contact 10.

The auxiliary contactor RC has three contacts 11, 12 and 13 controlled by a coil 16. Contacts 11, 12, 13 serve to short-circuit three resistors 17, 18 and 19, respectively, which are series connected between the line terminals and the motor terminals whenever the auxiliary contactor RC is energized. As will be explained more in detail hereinafter, the auxiliary contactor RC is normally energized and drops out temporarily during the intervals of transfer from one to another motor speed with the result that the resistors 17, 18 and 19 become effective in the motor circuit shortly before the transfer is initiated and are short-circuited and thus rendered ineffective shortly after a transfer is completed. In this manner, the resistors cushion the transitory current peaks that may otherwise have a disturbing effect on the system.

The contactor 1M has main contacts 20, 21, 22 and an interlock contact 23 controlled by a coil 24 and, when picked up, connects motor terminals T1 to the line terminals for operation at first motor speed. The contactor 2M has contacts 28 and 29 for shorting the terminals T1, and main contacts 25, 26, 27 for connecting the motor terminals T2 to the line terminals. The just-mentioned contacts, as well as an interlock contact 30 in contactor 2M, are controlled by a coil 31. Contactor 3M has main contacts 33, 34 and 35, short-circuiting contacts 36, 37, and an interlock contact 38 controlled by a coil 39 and, when picked up, connects motor terminals T3 to the line terminals while short-circuiting the terminals T4 for running the motor at third speed. The contactor 4M has its main contacts 41, 42 and 43 and an interlock contact 44 controlled by a coil 45 for connection of motor terminals T4 to the line terminals when the motor is to operate at maximum speed.

The coil circuits of the above-mentioned contactors are controlled by a system whose primary control device comprises a master controller which as a whole is denoted by MC. This master controller is composed of three movable members which are geared together by means of a differential transmission. The primary member of the control mechanism has a crank or the like manually adjustable element 50 to be actuated by the operator. This handle is shown to be associated with a pointer for cooperation with a scale on which are indicated the selective positions of the mechanism. In the illustrated example, the mechanism, aside from its "off" position, has four hoist positions and four lowering positions to permit a selective operation of the motor in one or the other direction at any one of the four available speeds. The handle 50 is mechanically connected with a shaft 51 which carries a contact control device 52. Device 52 is shown as a drum type contactor with two contact segments 53 and 54 to cooperate with contact fingers 55. The drum member 52 and its contact segments are illustrated in developed form. Connected with drum member 52 is the primary or input gear 56 of a differential transmission. The unit comprising the elements 50 through 56 is hereinafter referred to as the "primary member" of the master controller and is denoted as a whole by P.

The secondary member of the master controller MC has a gear 57 which forms part of the differential transmission. It is shown to be attached to a hollow shaft 58 which carries another gear 59. Mounted on shaft 58 is a contact control device 60 represented by a drum contactor for cooperation with stationary contact fingers, such as those denoted by 61. The drum member carries a group of interconnected contact segments denoted as a group by numeral 62. The particular configuration of these contact segments at the places denoted by 63 and 64 will be explained in a later place. The just-mentioned elements 57 through 62, as a unit, are hereinafter referred to as the "secondary member" of the master controller and denoted, as a whole, by S.

The above-mentioned differential transmission includes two planet gears 66 and 67 whose coaxial shafts are mounted on an inner shaft 68 which traverses the hollow shaft 58 of the secondary controller member and carries a contact member 70. Contact control member 70, in conformity with the two other contact members already mentioned, is represented, in developed form, as being of the drum type. The drum member 70 carries contact segments 71 to cooperate with contact fingers 72. The elements 66 through 72, as a whole, are hereinafter referred to as the "intermediate member" of the master controller and denoted by I.

The above-mentioned gear 59 of the secondary controller member meshes with a gear 73 which is driven through a suitable transmission, here denoted by a broken line 74, by the armature 75 of a reversible auxiliary or pilot motor N. The field winding of this motor is denoted by 76.

It will be noted that the field winding 76 is shown to be connected to terminals symbolically represented by ⊕ and ⊖. These symbols represent respectively the positive and negative terminal or bus of a suitable source of direct current, and the same way of representing such direct-current terminals or buses is used in other places of Fig. 1 as well as in Fig. 7.

According to Fig. 1, the armature circuit of the motor N includes two resistors 77 and 78 and is controlled by two relays LR and HR. Relay LR has three contacts 81, 82 and 83 controlled by a coil 84; and relay HR has three contacts 85, 86 and 87, controlled by a coil 88. The coil circuits of the two relays are mutually interlocked so that only one relay can be energized at a time. Either relay, when energized, closes the armature circuit of motor N and then causes it to turn the secondary controller member in one or the other direction depending upon which of the two relays is energized. As a result, the motor N is caused to move the secondary controller member in the direction and by the extent determined by any change in adjustment of a primary controller member. The movement of the primary member controlled by the operator, and the subsequent follow-up movement of the secondary controller member caused by the pilot motor N result in a forward and return movement of the intermediate controller member due to the fact that all three members are geared together by the above-mentioned differential transmission. The different movements thus occurring in the three controller members are used to control the relays and electromagnetic contactors of the system in the manner needed to obtain the desired speed transfer performance as will be understood from the following.

The armature circuit of motor N is also under control by the contacts 91 and 92 of a load-responsive relay PR whose coil 93 is connected in the circuit of motor M so as to be traversed by current only when motor M is set for third or fourth speed. When the current exceeds a given limit value while motor M is running at third speed, the load relay PR picks up and prevents the pilot motor N from moving the secondary control member into the fourth position, thus preventing a transfer to maximum speed as long as the overload conditions persist.

Excitation for the coil circuits of the above-described system is supplied from the line terminals L2 and L3 through an emergency switch 79 and under control by the contacts 94, 95 and 96 of a low-voltage relay LV whose coil is denoted by 97. The emergency switch 79 must be kept closed during the operating periods of the system. It may consist of a thumb contact in the handle of the master controller.

The brake B is released by a coil 100 under control by the contact 105 of brake relay BR.

The performance of the system as a whole will be more readily apparent if the functioning of the master controller is fully understood. A reference to the explanatory diagrams of Figs. 2, 3 and 4 will, therefore, first be presented in order to further elucidate the operation of the master controller.

In each of Figs. 2, 3 and 4, the primary controller member P, to be angularly adjusted by the operator, the intermediate controller member I, and the motor-driven secondary controller member S are schematically represented by three concentric ring members, respectively. In Fig. 2, these members are assumed to be all in the "off" position in accordance with the more detailed showing of the same members in Fig. 1. Each member, for the purpose of representing their respective angular positions, is provided with a mark $p$, $i$ and $s$, respectively. In Fig. 2, these marks are aligned with one another to indicate that all three members are in the "off" position. When the primary member P is turned by the operator in the direction of the arrow A1 (Fig. 3) into the fourth position, lowering, corresponding to an angular deflection of 120°, the intermediate member I will simultaneously move in the same direction as indicated by the arrow A2. Assuming that the movement of the primary member P is rapid so that the movement is completed before the pilot motor N is started, the secondary member S will at first remain at rest, and the angle of movement of the intermediate member I will be 60°, i. e., half the amount of angular travel of the primary member. The deflection of the intermediate member I has the effect of switching in the pilot motor N in order to make it turn the secondary member S in the direction of the arrow A3 (Fig. 3), opposite to that of the primary member I. While the secondary member S is moving, the intermediate member I is turned back, as is indicated in Fig. 3 by the arrow A4 until member I reaches the original position. In that position, the pilot motor is stopped so that the secondary member S remains in the angular position then reached. The conditions then obtaining are represented in Fig. 4: The primary member P is adjusted by the operator to its 120° position corresponding to the fourth hoisting position, the intermediate member I is back in the "off" position, and the secondary member S has turned 120° into its fourth position hoist and hence is now in positioned correspondence with the primary member.

Reverting now to Fig. 1, a description of a hoisting performance will now be given. When the emergency switch 79 is closed by the operator, the coil 97 of the low voltage relay is energized in the circuit:

L2—79—98—62—97—99—L3     (1)

Relay LV picks up, and its contact 96 closes for coil 106 of the brake relay BR the circuit:

L2—79—98—62—96—106—99—L3     (2)

Relay BR releases the brake B and thus prepares the winch for operation.

When thereafter the primary controller member is moved to point 1 hoist, segment 53 of contact member 52 closes for relay LV the self-sealing circuit:

L2—79—53—95—97—99—L3     (3)

Due to this self-sealing circuit, the low voltage relay LV remains energized when thereafter the secondary controller member is moved from its "off" position. Relay LV, however, drops out when, during the operation of the winch, the line voltage should drop below a safe value. As a result, the relay then deenergizes the control system and causes the winch motor to stop. Upon recurrence of proper line voltage, relay LV can be made to pick up only if the master controller is first returned to the "off" position. Thus a proper sequence of speed transfer is always secured.

The just-mentioned adjustment of the primary member P to first point hoist causes a corresponding angular adjustment of the intermediate member I into the first hoist position of the later member. As a result, the contact segment 71 completes for the relay HR the coil circuit:

L2—79—98—71—83—88—99—L3     (4)

Relay HR, by closing its contacts 85 and 86, completes for the armature 75 of the pilot motor M the circuit:

⊕—91—15—86—75—78—85—θ     (5)

Motor M runs in the direction required to turn the secondary controller member S in the hoist direction, while returning the intermediate member I to its "off" position. When the drum 60 of the secondary member S reaches its first position, hoist, the contact drum 70 of the intermediate member I is back in its "off" position and opens the coil circuit (4) so that relay HR drops out and stops the motor N by opening its armature circuit (5). In the position first point hoist now occupied by the contact drum 60 of member S, the hoist contactor HC closes its contacts 6 to 10 because its coil 8 is energized in the circuit:

L2—79—98—62—8—99—L3     (6)

Contacts 6 and 7 prepare the motor circuit for operation in the hoisting direction, and contact 10 maintains the brake relay BR energized. Coil 16 of contactor RC is energized in parallel to coil 8 of contactor HC so that the resistors 17, 18 and 19 are short-circuited by respective contacts 11, 12 and 13. The coil 24 of contactor 1M is energized in circuit:

L2—79—62—101—24—30—44—99—L3     (7)

Consequently, contacts 20, 21 and 22 close and connect the motor terminals T1 to the line terminals for running the motor at first speed in the hoisting direction.

When the primary member P of the master controller is advanced to the second position hoist, the intermediate member I and the secondary member S perform corresponding movements, as explained in the foregoing. At the end of these of these movements, the intermediate member is back in its "off" position while the secondary member S, driven by the motor N, has reached the second position hoist. In this position of the appertaining contact drum 60, the coil circuit (7) of contactor 1M is interrupted at segment 62 in the master controller, and the coil 31 of contactor 2M is instead energized in the circuit:

L2—79—98—62—102—31—38—23—99—L3     (8)

The motor M is now energized through terminals T2 and operates at second speed.

When the primary member P of the master controller is turned to the third position hoist, the intermediate member I causes the motor M to move the secondary member S also into third position hoist. When that position is reached, the secondary member interrupts the coil circuit (8) of contactor 2M and instead energizes the coil 39 of contactor 3M in the circuit:

L2—79—98—62—103—39—30—44—99—L3     (9)

As the contact drum 60 moves from the second to the third position hoist, the circuit of coil 16 of relay RC is temporarily interrupted due to the particular configuration of the contact segment 62 at 63. The segment is so designed that the relay RC is deenergized and inserts the resistors 17, 18 and 19 into the motor circuit a moment before the contactor 3M picks up, and shorts out the resistors immediately after the terminals T3 are energized. Consequently, the resistors are in operation during the transfer interval and reduce the current surges that might otherwise occur. In this manner, the system secures a rather smooth speed transfer. At the lower speeds, where detrimental current surges are unlikely to occur, the illustrated system does not provide for the temporary insertion of resistors. If desired, however, the secondary controller member can readily be designed to apply the resistors also when transferring from first to second speed or when passing from the "off" position to first point hoist. It will be noted that in the illustrated example, the relay RC is caused to insert the resistors in the motor circuit also during the interval of transfer from third to fourth speed.

When turning the master controller into the fourth position hoist, the coil circuit (9) of contactor 3M is interrupted and the coil 45 of contactor 4M is energized in the circuit:

L2—79—98—62—104—45—38—23—99—L3     (10)

Contactor 4M then energizes the motor terminals T4 for operation at highest hoisting speed.

When the primary member of the master controller is moved from fourth position hoist to the "off" position, the above-described control functions occur in the reverse order.

The lowering performance of the system is substantially the same as described above, except that instead of the contactor HC the lowering contactor LC is energized while instead of relay HR the relay LR picks up during the transfer intervals in order to operate the pilot motor N in the direction opposite to that mentioned in the foregoing.

Due to the fact that the speed of the transfer performance in a system according to the invention is determined by the speed of the pilot motor or by the action of a load relay, the system does not require the use of timing relays and the like devices of the type heretofore proposed for control systems of this kind. The speed of the pilot motor can be adjusted in accordance with requirements of each particular application and the system prevents automatically any disturbance or damage due to a too rapid actuation of the master controller by the operator.

In Fig. 1 the master controller MC is shown as having contact devices of the drum type in order to present the complete circuit diagram more conveniently and more lucidly within a single figure. In practice, the contact devices of the master controller may consist of cam operated switches. Embodiments of such cam type devices are shown in Figs. 5 and 6, respectively.

According to Fig. 5, the input member of the master controller comprises a handwheel 150 firmly mounted on a shaft 151 which carries a cam member 152 for actuating an electric switching device (not shown). Firmly mounted on the input shaft 151 is also a wheel member 156' which carries a gear 156. The just-mentioned elements as a whole represent the primary member of the master controller and perform the function of a primary member P represented in Fig. 1.

Revolvably mounted on the shaft 151 is a sleeve 158 which carries a gear 159 and also a number of cams 160 for the actuation of a corresponding number of electric switches (not shown). Also mounted on the sleeve 158 is a spur gear 157. The parts denoted by 157 through 160 as a whole represent the secondary member of the master controller and correspond, as to function, to the secondary member S according to Fig. 1.

The gears 156 and 157 as illustrated in Fig. 5 form the orbit gear and sun gear, respectively, of a planetary gear mechanism. The appertaining planet gears 166 and 167 are revolvably mounted on a carrier 168 which is revolvable about the sleeve 158 and carries a cam 170 for the actuation of another switch (not shown). The elements 166 through 170 as a whole form the intermediate member of the master controller and, as regards function, correspond to the intermediate member I as represented in Fig. 1. Meshing with the gear 159 of the secondary member S, according to Fig. 5, is a pinion 173 whose shaft 174 is driven by an auxiliary motor corresponding to the pilot motor N in Fig. 1.

When the handwheel 150 (Fig. 5) is rotated by the operator in order to place it into one of the selective hoisting or lowering positions, the cam 152 of the primary member actuates the appertaining switch and thereby energizes without delay the low-voltage relay of the system in the same manner as described above with reference to the performance of the contact elements of the primary control member I of Fig. 1. The angular adjustment of the handwheel 150 is transmitted by the orbit gear 156 and the plan gears 166 and 167 to the carrier 168 and the cam 170. The appertaining switch causes the pilot motor to turn the shaft 174 and the pinion 173 in the direction needed to move the gear 179 and the cams 160 of the secondary member in the direction required to adjust the system for the operation selected by the operator. Simultaneously, the intermediate member turns back to the "off" position so that the pilot motor is stopped when the secondary member reaches the proper control position. It will be recognized that despite the structural differences of a cam type mechanism, as compared with the drum type master controller of Fig. 1, the control functions remain essentially the same.

The portion of a cam type master controller represented in Fig. 6 differs from that of Fig. 5 substantially only with respect to the arrangement and design of the appertaining gear members. According to Fig. 6, the primary shaft 251, to be angularly adjusted by the operator, carries a sleeve 258 which is revolvable about the shaft and carries a gear member 257 and a number of switch-actuating cams 260. The elements 257, 258 and 260, as a unit, form the secondary member of the master controller. Firmly mounted on a shaft 251 is a sun gear 256. A group of planet gears, such as the one denoted by 266, are in meshing engagement with the sun gear 256 and also in meshing engagement with the interior or orbit gearing of the gear 257. The planet gear 266 is revolvably mounted on a carrier 268 which, in turn, is firmly attached to a sleeve 268'. Sleeve 268 is revolvable about shaft 251 and carries a cam 270 for actuating a switch (not shown). The elements 266, 268, 268' and 270, as a unit, represent the intermediate member of the master controller. Additional cams and a handwheel or the like manual adjusting member (not shown) are mounted on the shaft 251.

When the shaft 251 is turned by the operator, the intermediate member is angularly displaced and causes its cam 270 to switch in the pilot motor. This motor drives the shaft 274 of a beveled gear 273 which is in meshing engagement with exterior, beveled teeth of the gear 257 and hence imparts the required follow-up motion to the secondary member of the mechanism. It will again be recognized that the function of the control device according to Fig. 6 is substantially similar to that represented in Fig. 1.

For many cases of application, a timed performance of the multispeed motor is required only when changing the motor speed between the higher speed values, while a more rapid response of the motor to changes in speed setting is desired or permissible when the motor operates at low speeds. The system according to the invention which permits such a limitation of the timing performance to higher motor speeds is shown in Fig. 7.

According to Fig. 7, the cable drum D of a hoist or winch is equipped with a friction brake B and driven from an alternating-current multispeed motor with four terminal groups T1, T2, T3 and T4 for operation at first, second, third or fourth speed depending upon which terminal group is energized from the line terminals L1, L2 and L3. The connection between line terminals and motor terminals is controlled by two alternatively energized reversing contactors LC and HC, an auxiliary contactor RC, and four speed controlling contactors 1M, 2M, 3M and 4M. The system includes also a relay BR for controlling the brake B, a load-responsive relay PR for preventing the motor to transfer to maximum speed when the load current is excessive, and a low-voltage relay LV. The performance of these contactors and relays is essentially controlled by a master controller MC which includes a differential gear G whose secondary member is driven by a reversible motor N. The relay system is energized through an emergency switch 379 which must be kept closed during the performance periods of the system.

More in detail, the contactor LC has main contacts 301 and 302 and interlock contacts 304, 305 controlled by a coil 303 which is energized when the system is set for hoisting operation. The contactor HC has main contacts 306, 307 and interlock contacts 309, 310 controlled by a coil 308. This coil is energized during the hoisting performance of the system. The contactor RC has contacts 311, 312, 313, 314 and 315 controlled by a coil 316 and serves to include in the motor circuit the resistors 317, 318 and 319 during the intervals of transition from second to third speed, or from third to fourth speed, and vice versa, as explained above with respect to the contactor RC and resistors 17, 18, 19 of Fig. 1.

The contactor 1M has contacts 320, 321, 322 and 323 controlled by a coil 324 and, when picked up, connects the motor terminals T1 to the line terminals for operating the motor M with thirty-two field poles for lowest (first) speed. The contactor 2M has contacts 325, 326 and 327, 328, 329 controlled by a coil 331 and, when picked up, connects motor terminals T1 to the line while short circuiting the terminals T1 for operating the motor with sixteen poles at second speed. The contactor 3M has contacts 333, 334, 335, 336, 337, 338, 340 controlled by a coil 339 and, when energized, connects the motor terminals T3 to the line and shorts the terminals T4 for operating the motor with light poles at third speed. The contactor 4M has its contacts 341, 342 and 343 controlled by a coil 345 for connecting, when energized, the motor terminals T4 to the line for running the motor with four poles at maximum (fourth) speed.

The load-responsive relay PR has contacts 391 and 392 which control the energizing circuit of the auxiliary or pilot motor N and are opened by the appertaining relay coil 393 when the load current of the motor M exceeds a given maximum value while the motor M is running at third speed. The function of relay PR is similar to that of the relay PR shown in Fig. 1 and described previously.

The load-voltage relay LV, according to Fig. 7, has a control contact 394 and a self-sealing contact 395 controlled by a coil 397. This coil becomes energized when the emergency switch 379 is closed while the master controller is in the illustrated position and then seals itself in due to the closing of contact 395. The brake relay BR has a contact 405 controlled by a coil 406 so that the contact is closed whenever the master controller is in any of the available hoist or lowering positions. Contact 405 then energizes the coil 500 of brake B in order to release the motor M for operation.

The master controller MC has a primary member P which includes a manually adjustable input member 350 to be actuated by the operator. A pointer and a scale associated with the input member 350 indicate the selected hoist or lower position. The shaft 351 of the input member is connected with a contact 352 which in Fig. 7 is shown developed as a drum type contactor. The secondary member S of the master controller is represented as a drum contactor 360 with contact segments 361 and 362. This contactor is connected with the shaft 358 of a differential gear G and driven from the shaft 374 of the motor N. The intermediate member I, also forming part of a master controller MC, is represented in Fig. 7 as a drum contactor 370 with contact segments denoted by Fig. 7.

In contrast to the master control devices described above in conjunction with Figs. 1, 5 and 6, the master controller represented in Fig. 7 is so designed that the primary member P or the appertaining input member 350 do not transmit a control movement to the intermediate member I and, hence, do not cause a follow-up movement of the secondary member S when the primary member is moved from the "off" position to the first position (hoist or lower) or from the first position to the second position (hoist or lower), and vice versa. Thus the master controller according to Fig. 6 produces a movement of the intermediate member I and of the secondary member S only when the primary member is moved from second to third position or from third to fourth position, or vice versa, either in the hoist or lowering direction. A master control mechanism capable of such performance is shown in Figs. 8 and 9 and will first be described before further dealing with the performance of the system.

The master control mechanism shown in Figs 8 and 9 is of the cam type. Its primary member, to be angularly adjusted by the operator, has a shaft 351 which corresponds to the equally designated shaft of the master controller shown in Fig. 7. Shaft 351 carries a number of cams such as those denoted by 352. These cams serve to actuate corresponding switches (not shown). Firmly attached to the shaft 351 is a disk 340 which carries a projection 346 located between two projections 348 and 349 of a gear member 356 which is revolvable about the shaft 351. A spring 363 is disposed around the hub portions of the members 340 and 356. The ends of spring 363 straddle a pin 364 of the gear member 366 and a stationary pin 365 (Figs. 8 and 9). The projection 346 is angularly spaced from the projections 348 and 349 so that the disk 340 and the entire primary member of the mechanism can be moved from the "off" position to the first and second position, hoist or lower, without establishing contact between projection 346 and one of the projections 348 and 349. However, when the primary member now is moved from the second position to the third position or from the third position to the fourth position in the hoisting or lowering direction, the projection 346 abuts against one of the other projections and thereby entrains the gear member 356 while tensioning the spring 363. The gear member 356 then transmits the movement to the intermediate member of the master control mechanism and thus causes the second member to perform a follow-up movement in the manner described in the following.

The member 356 carries an orbit 356' which is in meshing engagement with planet gears 366 and 367. These planet gears engage a sun gear 357 firmly mounted on a sleeve 358 that is revolvable about a shaft 351. Sleeve 358 carries also a spur gear 359 and a number of cams 360 for operating corresponding electric switches (not shown). Gear 359 is driven on shaft 374. The parts 357, 358, 359 and 360, as a unit, represent the secondary member (S) of the mechanism. The planet gears 366 and 367 are revolvably mounted on a carrier 368 which is revolvable about the hub portion of the sun gear 357 and carries a cam member 370. Parts 366, 367, 368 and 370, as a unit, represent the intermediate member (I) of the mechanism. The cam 370 serves to actuate a switch (not shown).

When the primary shaft 351 of the mechanism according to Figs. 8 and 9 is moved by the operator from the "off" position to the first and second position in either direction, only the contact devices of the primary member are actuated while the intermediate member and the secondary member remain in the "off" position. When the operator turns the primary shaft from the second position to the third position, or from the third to the fourth position, or vice versa, the gear member 356 is entrained to follow this movement and to move the intermediate member, thus causing the secondary member to be driven.

Reverting now to Fig. 7, it will be understood that when the primary member P is moved between any positions located between second point hoist and second point lower, only this member is effective to change the control setting of the system, while the members I and S remain in the illustrated off position. When the primary member P is moved between the second and fourth positions in either direction, the intermediate member I performs a deflecting and return motion during each interval of change, and the secondary member S performs a follow-up motion, driven by the motor N, during that interval. The functions thus obtained will be recognized from the following description of a hoisting performance.

When the line terminals L1, L2 and L3 are energized, the closing of the emergency switch 379 energizes the coil 397 of the relay LV. This relay, by closing its holding contact 395, seals itself in, in order to maintain its main contact 394 closed during the subsequent period of motor performance provided the line voltage maintains its proper value.

Moving now the primary member P of the master controller from the "off" position to first point hoist, while controller members I and S as explained above, remain in the "off" position, has the effect of closing for coil 308 of the hoist contactor HC the circuit:

L2—398—308—MC—394—395—379—L3    (11)

Contact 310 of contactor HC energizes the coil 406 of the brake relay BR in the circuit:

L2—398—406—310—361—401—
394—395—379—L3    (12)

Hence, the brake B is released and the motor M ready for operation. Contactor IM picks up because its coil 324 is now energized in the circuit:

L2—398—338—324—MC—
394—395—379—L3    (13)

Contacts 320, 321, 322 now connect the motor terminals T1 to the line so that the motor operates at first speed.

When the primary member P of the master controller is advanced to the second position hoist, the members I and S again remain unaffected and the following changes occur. Contactor IM drops out because its coil circuit (13) is interrupted in the master controller MC. Contactor 2M picks up because its coil 331 is now energized in the circuit:

L2—398—323—340—331—MC—
394—395—379—L3    (14)

As explained above, the movement of the primary member from the second to the third point hoist is transmitted to the differential gear mechanism G and causes the intermediate member I to move one step into its third position hoist. This has the effect of energizing the auxiliary motor N in the circuit:

L2—398—N—391—371—399—379—L3    (15)

Motor N now moves the secondary member S into third position hoist while returning the intermediate member I to the "off" position. When the intermediate member is again at rest, the secondary member is in its third position hoist. In this position, the contactor 3M picks up because its coil 339 is energized in the circuit:

L2—398—339—362—400—310—
361—401—394—395—379—L3    (16)

Contact 340 opens the coil circuit (15) of contactor 2M and contacts 333 though 337 connect terminals T3 to the line for operating motor M with eight poles at third speed.

When the primary member of the master controller is moved to fourth position hoist, this movement is again transmitted to the intermediate member I which turns first into its fourth position hoist and thereby causes the motor N to move the secondary member into fourth position hoist while returning the intermediate member to the "off" position. During this movement, the coil circuit (16) of contactor 3M is interrupted at segment 362 of member S, and thereafter the coil 345 of contactor 4M is energized in the circuit:

L2—398—323—340—345—362—400—310—
361—401—394—395—379—L3    (17)

Contactor 4M now connects the motor terminals T4 to the line for operating the motor with four field poles at maximum speed.

In the "off" position of the secondary member S and hence when the primary member of the master controller is either in the "off" position or in first or second position hoist or lower, the coil 316 of the auxiliary contactor RC is energized in the circuit:

L2—398—316—362—401—
394—395—379—LR    (18)

Consequently, the contacts 311, 312 and 313 of contactor RC are closed, so that the resistors 317, 318 and 319 are short circuited. However, when the secondary member is moving from its "off" position to the third position hoist or lower, the coil circuit (18) of contactor RC is temporarily interrupted (at 362) so that the resistors 317, 318 and 319 are series connected in the load circuit of the motor M shortly before the speed transfer is initiated and are again shorted immediately after the load circuit is adjusted for the newly selected speed. The same temporary deenergization of contactor RC occurs when the secondary member of the master controller moves from the third to the fourth position hoist or lowered. In this manner, the possibility of damage by excessive starting loads is reduced in the same manner as explained above with reference to the embodiment of Fig. 1.

When the motor is running at third speed, the coil 939 of relay PR is energized and if, at this speed, the load current of motor M exceeds a given maximum value, the relay PR picks up and opens its contacts 391 and 392 thus interrupting the energizing circuit (15) for the auxiliary motor N. When under such overload conditions the master controller is adjusted to fourth speed, the motor N will nevertheless remain at rest and thus prevent the motor M from being switched over to maximum speed as long as the overload conditions persist. When the master controller is moved from fourth position hoist toward the "off" position, the above-described control functions are performed in the inverse order and the motor N, when energized, will run in the opposite direction due to the fact that the oscillatory movements of the intermediate member are reversed. The lowering performance of the motor is similar to the above-described hoisting performance except that the contactor HC remains deenergized while contactor LC is maintained picked up so as to apply the line voltage to the motor M in the opposite phase sequence in order to run the motor M in the lowering or payout direction.

In a motor control system, according to Fig. 7, the speed transfer between the lower speeds occurs at the speed with which the operator changes the adjustment of the master controller. During speed changes between the higher speeds, however, the speed transfer is dependent upon the timing function of the differential gear mechanism driven by the motor N and hence involves always a predetermined delay regardless of the speed at which the master controller may be actuated by the operator.

It will be understood by those skilled in the art that the invention permits of various alterations and modifications other than those illustrated and described in this disclosure without departing from the principles of our invention and within the scope of the essential features of the invention, as set forth in the claims annexed hereto.

We claim as our invention:

1. In combination, an electric contact device having a primary member, an intermediate member and a secondary member, said three members being coaxially revolvable and each equipped with contact means to be controlled in dependence upon the angular position of said respective members, operator-actuable means for selectively adjusting said primary member between a plurality of angular positions, a differential gear mechanism associated with said three members so that said intermediate member deflects from an "off" position due to a change in position of said primary member and returns to said "off" position when said secondary member is driven toward positional correspondence with said primary member, a reversible motor in driving connection with said secondary member, circuit means connected with said motor for energizing the latter and controlled by said contact means of said intermediate member for causing said motor to drive said secondary member into positional correspondence with said primary member when said intermediate member is deflected from said "off" position, and a circuit system to be controlled having a first circuit connected to said contact means of said primary member to be rapidly controlled when said primary member is moved into a given one of its positions, said circuit system having a second circuit connected to said contact means of said secondary member to be controlled in a given sequential relation and with timed performance relative to the control of said first circuit.

2. Electric control means, comprising a primary member selectively adjustable between a plurality of portions, a driven secondary member movable between a plurality of positions, an intermediate member deflectable in opposite directions from an "off" position, differential gear means associated with said three members so that said intermediate member deflects from said "off" position due to a change in position of said primary member and returns to said "off" position when said secondary member is driven to change its position toward correspondence with the position of said primary member, a reversible electric motor in driving connection with said secondary member, circuit means connected with said motor for energizing the latter, said intermediate member having contact means connected with said circuit means for controlling it to run said motor when said intermediate member is deflected from said "off" position whereby said secondary member is driven into positional correspondence with said primary member, first contact means associated with said primary member, second contact means associated with said secondary member and a circuit system selectively adjustable to a plurality of respective control conditions and having first circuit means connected to said first contact means to be controlled thereby and having second circuit means connected to said second contact means to be controlled by the latter so that a change in control of said first circuit means occurs at a speed dependent upon the speed of adjustment of said primary member while a change in control of said second circuit means is limited in speed by the operation of said motor relative to said speed of adjustment of said primary member.

3. Electric control means, comprising a primary member selectively adjustable between a plurality of portions, a driven secondary member movable between a plurality of positions, an intermediate member deflectable in opposite directions from an "off" position, differential gear means associated with said three members so that said intermediate member deflects from said "off" position due to a change in position of said primary member and returns to said "off" position when said secondary member is driven to change its position toward correspondence with the position of said primary member, a lost-motion coupling interposed between said primary member and said differential gear mechanism to permit limited individual movement of said primary member between some of its positions while entraining said gear mechanism to cause movement of said intermediate member only when said primary member is moved beyond said latter positions, a reversible electric motor in driving connection with said secondary member, circuit means connected with said motor for energizing the latter, said intermediate member having contact means connected with said circuit means for controlling it to run said motor when said intermediate member is deflected from said "off" position whereby said secondary member is driven into positional correspondence with said primary member, first contact means associated with said primary member, second contact means associated with said secondary member, and a circuit system selectively adjustable to a plurality of respective control conditions and having first circuit means connected to said first contact means to be controlled thereby and having second circuit means connected to said second contact means to be controlled by the latter so that a change in control of said first circuit means occurs at a speed dependent upon the speed of adjustment of said primary member while a change in control of said second circuit means is limited in speed by the operation of said motor relative to said speed of adjustment of said primary member.

4. A motor control system comprising a variable-speed motor, electric circuit means for controlling its speed, selective control means disposed for controlling said circuit means and having a manually movable primary member selectively adjustable between a plurality of positions in accordance with the desired motor speed, said control means having a driven secondary member movable between a plurality of positions and an intermediate member deflectable in opposite directions from an "off" position, a differential gear mechanism forming part of said control means and being associated with said three members so that said intermediate member deflects from said "off" position due to a change in position of said primary member and returns to said "off" position when said secondary member is driven to change its position toward correspondence with the changed position of said primary member, a reversible auxiliary motor in driving connection with said secondary member, a circuit connected with said auxiliary motor for energizing the latter, said intermediate member having contact means connected with said circuit for controlling it to energize said auxiliary motor when said intermediate member is deflected from said "off" position so that said secondary member is then driven by said auxiliary motor into positional correspondence with said primary member, first contact means associated with said primary member and connected to said circuit means for energizing the latter only when said primary member is placed in a position to cause said variable speed motor to operate, second contact means associated with said secondary member and connected to said circuit means for controlling the latter to adjust said variable-speed motor to operate at a speed determined by the position of said secondary member.

5. A motor control system comprising a variable-speed motor, electric circuit means connected to said motor for controlling its speed, selective control means disposed for controlling said circuit means and having a manually movable primary member selectively adjustable between a lurality of positions in accordance with the desired motor speed, said control means having a driven secondary member movable between a plurality of positions and an intermediate member deflectable in opposite directions from an "off" position, a differential gear mechanism forming part of said control means and being associated with said three members so that said intermediate member deflects from said "off" position due to a change in position of said primary member and returns to said "off" position when said secondary member is driven to change its position toward correspondence with the changed position of said primary member, a lost-motion coupling interposed between said primary member and said differential gear mechanism to permit limited individual movement of said primary member between some of its positions while entraining said gear mechanism to cause movement of said intermediate member when said primary member is moved beyond said latter positions, a reversible auxiliary motor in driving connection with said secondary member, a circuit connected with said auxiliary motor for energizing the latter, said intermediate member having contact means connected with said circuit for controlling it to energize said auxiliary motor when said intermediate member is deflected from said "off" position so that said secondary member is then driven by said auxiliary motor into positional correspondence with said primary member, first contact means associated with said primary member, second contact means associated with said secondary member, said circuit means having at least one circuit connected to said first contact means for controlling said variable-speed motor to operate at low speed and having at least one other circuit connected to said second contact means for controlling said variable speed motor to operate at high speed.

6. A motor control system comprising a multi-speed alternating-current motor having a plurality of terminal groups for operating the motor at different respective speeds, line terminal for energizing said motor, control means disposed for selectively connecting said terminal groups to said line terminals, a master controller having a primary member selectively adjustable between a plurality of positions for selecting the motor speed, an intermediate member deflectable in opposite directions from an "off" position, and a secondary member movable between a plurality of positions, a differential gear mechanism forming part of said master controller and being associated with said three members so that said intermediate member deflects from said "off" position of said primary member and returns to said "off" position when said secondary member is driven to change its position toward correspondence with the changed position of said primary member; a reversible auxiliary motor in driving connection with said secondary member, an energizing circuit connected to said auxiliary motor, said intermediate member having contact means for controlling said energizing circuit to operate said auxiliary motor to drive said secondary member into positional correspondence with said primary member when said intermediate member is deflected from its "off" position, and contact means associated with said secondary member and forming part of said control means so as to connect said respective terminal groups to said line terminals depending upon the position of said secondary member.

7. A motor control system comprising a multi-speed alternating-current motor having a plurality of terminal groups for operating the motor at different respective speeds, line terminals for energizing said motor, a plurality of selectively operable contactors for connecting said line terminals to said terminal groups respectively, a master controller having a primary member selectively adjustable between a plurality of positions for selecting the motor speed, and an intermediate member deflectable in opposite directions from an "off" position and a secondary member movable between a plurality of portions, a differential gear mechanism forming part of said master controller and being associated with said three members so that said intermediate member deflects from said "off" position due to a change in position of said primary member and returns to said "off" position when said secondary member is driven to change its position toward correspondence with the position of said primary member, a reversible auxiliary motor in driving connection with said secondary member and an energizing circuit connected to said auxiliary motor, said intermediate member having contact means for controlling said energizing circuit to operate said auxiliary motor to drive said secondary member into positional correspondence with said primary member when said intermediate member is deflected from its "off" position, and contact means associated with said secondary member and connected with said respective contactors for causing at least one of them to connect the corresponding terminal group to said line terminal depending upon the position of said secondary member.

8. A motor control system comprising a multi-speed alternating-current motor having a plurality of terminal groups for operating the motor at different respective speeds, line terminals for energizing said motor, a plurality of selectively operable contactors for connecting said line terminals to said terminal groups respectively, a master controller having a primary member selectively adjustable between a plurality of positions for selecting the motor speed, and an intermediate member deflectable in opposite directions from an "off" position and a secondary member movable between a plurality of positions, a differential gear mechanism forming part of said master controller being associated with said three members so that said intermediate member deflects from said "off" position due to a change in position of said primary member and returns to said "off" position when said secondary member is driven to change its position toward correspondence with the position of said primary member, a reversible auxiliary motor in driving connection with said secondary member, an energizing circuit connected to said auxiliary motor, said intermediate member having contact means for controlling said energizing circuit to operate said auxiliary motor to drive said secondary member into positional correspondence with said primary member when said intermediate member is deflected from its "off" position, first contact means associated with said primary member and connected to at least one of said contactors appertaining to a terminal group for low motor speed so as to cause said variable-speed motor to operate at said low speed when said primary member is in a corresponding position, and second contact means associated with said secondary member and connected to at least one other contactor appertaining to a terminal group for high speed so as to cause said variable-speed motor to operate at said high speed when said secondary member is in a corresponding position.

9. A motor control system comprising a multi-speed alternating-current motor having a plurality of terminal groups for operating the motor at different respective speeds, line terminals for energizing said motor, a plurality of selectively operable contactors for connecting said line terminals to said terminal groups respectively, a master controller having a primary member selectively adjustable between a plurality of positions for selecting the motor speed, and an intermediate member deflectable in opposite directions from an "off" position and a secondary member movable between a plurality of positions, a differential gear mechanism forming part of said master controller and being associated with said three members so that said intermediate member deflects from said "off" position due to a change in position of said primary member and returns to said "off" position when said secondary member is driven to change its position toward correspondence with the position of said primary member, a lost-motion coupling interposed between said primary member and said gear mechanism to permit individual movement of said primary member between some of its positions for low motor speed while entraining said gear mechanism to cause movement of said intermediate member when said primary member is moved between its other positions for higher motor speed, a reversible auxiliary motor in driving connection with said secondary member and an energizing circuit connected to said auxiliary motor, said intermediate member having contact means for controlling said energizing circuit to operate said auxiliary motor to drive said secondary member into positional correspondence with said primary member when said intermediate member is deflected from its "off" position, first contact means associated with said primary member and connected to at least one of said contactors appertaining to a terminal group for low motor speed so as to cause said variable-speed motor to operate at said low speed when said primary member is in a corresponding position, and second contact means associated with said secondary member and connected to at least one other contactor appertaining to a terminal group for high speed so as to cause said variable-speed motor to operate at said high speed when said secondary member is in a corresponding position.

10. A motor control system comprising a multi-speed alternating-current motor having a plurality of terminal groups for operating the motor at different respective speeds depending upon which terminal group is energized at a time, line terminals for supplying alternating current, a plurality of selective contact means interposed between said line terminals and said terminal groups respectively, master control means having a selectively adjustable primary member and a moveable secondary member and including a follow-up drive for positioning said secondary member in accordance with the selective adjustment of said primary member at a speed determined by that of said drive, said secondary member being connected so at least two of said contact means in order to control them to energize the appertaining terminal groups in a sequence determined by the adjustment of said primary member, resistance means, and contact means under control by said secondary member for temporarily connecting said resistance means between said line terminals and said motor during the intervals of transfer from one to the other of said terminal groups.

WALTER SCHAELCHLIN.
KURT MAHNKE.

REFERENCES CITED

The following references are of record in the file of this patent:

UNITED STATES PATENTS

| Number | Name | Date |
|---|---|---|
| 1,824,856 | Williams | Sept. 29, 1931 |
| 1,897,059 | Kuhn et al | Feb. 14, 1933 |